US012208900B2

(12) United States Patent
Vuagniaux et al.

(10) Patent No.: US 12,208,900 B2
(45) Date of Patent: Jan. 28, 2025

(54) AIRCRAFT INTERIOR UNIT WITH DETACHABLE PANEL

(71) Applicant: Safran Seats GB Limited, Wales (GB)

(72) Inventors: Joseph Vuagniaux, Wales (GB); Mark Douglas, Wales (GB); Daniel Parish, Wales (GB)

(73) Assignee: Safran Seats GB Limited, Cwmbran (GB)

( * ) Notice: Subject to any disclaimer, the term of this patent is extended or adjusted under 35 U.S.C. 154(b) by 119 days.

(21) Appl. No.: 18/076,650

(22) Filed: Dec. 7, 2022

(65) Prior Publication Data

US 2023/0182902 A1 Jun. 15, 2023

(30) Foreign Application Priority Data

Dec. 10, 2021 (GB) ...................................... 2117901

(51) Int. Cl.
*B64D 11/06* (2006.01)
*B64D 11/00* (2006.01)

(52) U.S. Cl.
CPC .. *B64D 11/0606* (2014.12); *B64D 2011/0046* (2013.01)

(58) Field of Classification Search
CPC ........................... B64C 11/0606; E06B 3/4423
See application file for complete search history.

(56) References Cited

U.S. PATENT DOCUMENTS 11,591,090 B2 * 2/2023 Bonnefoy .......... B64D 11/0606
2017/0106980 A1 * 4/2017 Kuyper .............. B64D 11/0604
2019/0329891 A1 * 10/2019 Bonnefoy .......... B64D 11/0606
2021/0039790 A1 * 2/2021 Robinson .............. E06B 3/5072
2021/0147083 A1 * 5/2021 Dowty .................. B64C 1/1438
2021/0163140 A1 * 6/2021 Jasny ................. B64D 11/0602

FOREIGN PATENT DOCUMENTS

EP 3225548 A1 10/2017
EP 3822113 A1 5/2021

OTHER PUBLICATIONS

United Kingdom Patent Application No. 2117901.5, Search Report, dated Jun. 1, 2022.
Europe Patent Application No. 22211575.0, Search Report, dated Mar. 30, 2023.

* cited by examiner

*Primary Examiner* — Michael C Zarroli
*Assistant Examiner* — Ryan Andrew Yankey
(74) *Attorney, Agent, or Firm* — Kilpatrick Townsend & Stockton LLP (57) ABSTRACT

An aircraft interior unit with a detachable panel. The aircraft interior unit comprises a wall comprising a hollow panel, and a door mounted to the wall. The door is slidable between a closed position in which it covers an entrance to the aircraft interior unit, and an open position in which the entrance to the aircraft interior unit is uncovered. In the open position, the door is at least partially disposed within the hollow panel of the wall. The hollow panel can be detached from the rest of the aircraft interior unit, and the door, when moved from the open position, can be detached from the wall.

11 Claims, 13 Drawing Sheets

AIRCRAFT INTERIOR UNIT WITH DETACHABLE PANEL

CROSS-REFERENCE TO RELATED APPLICATIONS

The present application claims priority from, and is a nonprovisional application of, United Kingdom Patent Application No. 2117901.5 filed on Dec. 10, 2021, the entire contents of which are herein incorporated by reference for all purposes.

TECHNICAL FIELD OF THE INVENTION

The present invention concerns an aircraft interior unit, such as an aircraft seating unit. More particularly, but not exclusively, the invention concerns an aircraft interior unit with a wall having a detachable hollow panel.

BACKGROUND OF THE INVENTION

It can be desirable or necessary for aircraft interior units to have detachable panels. For example, it may be a requirement in order allow a disabled passenger to more easily enter an aircraft seating unit. While aircraft interior units with detachable panels are known, special tools are required to detach and reattach the panels. Such panels can be difficult to detach where there is limited access, as well as requiring a large footprint. An aircraft interior unit with a detachable panel that could be detached and reattached without the need for special tools (or indeed any tools), and that does not require a large footprint, would be desirable, so that it could be more easily used by aircraft cabin staff and the like.

The present invention seeks to solve and/or mitigate the some or all of the above-mentioned problems. Alternatively and/or additionally, the present invention seeks to provide improved aircraft interior units.

SUMMARY OF THE INVENTION

In accordance with a first aspect of the invention there is provided an aircraft interior unit comprising a wall comprising a hollow panel, and a door mounted to the wall, the door being slidable between a closed position in which it covers an entrance to the aircraft interior unit, and an open position in which the entrance to the aircraft interior unit is uncovered; wherein the door, when in the open position, is at least partially disposed within the hollow panel of the wall; wherein the hollow panel can be detached from the rest of the aircraft interior unit; and wherein the door, when moved from the open position, can be detached from the wall.

Having a hollow panel in which the door can move, while both the hollow panel and door are detachable from the rest of the aircraft interior unit, allows a detachable panel arrangement that is aesthetic and efficiently uses space without requiring a greater footprint to be provided. In addition, a panel that is easily detachable and re-attachable without any tools being required can be provided. The hollow panel may be detachable while the door is still attached to the wall, so that the door can be detached following the hollow panel being detached. Alternatively, the door may be detachable prior to the hollow panel being detached. Preferably, the door and the hollow panel are configured to be removed from the wall separately from each other. Preferably the aircraft seat unit is configured such that, in use, the door can be removed from the wall then subsequently the hollow panel can be removed from the wall, or the hollow panel can be removed from the wall then subsequently the door can be removed from the wall.

In embodiments, a portion of the wall may extend above the hollow panel. In other embodiments, the hollow panel may comprise the entirety of the wall. In embodiments where the hollow panel does not comprise the entirety of the wall, some or all of the rest of the wall may also be hollow.

In embodiments, the aircraft interior unit may comprise walls other than the wall of which the hollow panel comprises.

In embodiments, the hollow panel may be detachably mounted to a portion of the wall.

In embodiments, the portion of the wall to which the hollow panel may be detachably mounted is on the opposite side of the hollow panel to the door when in the open position.

In embodiments, the hollow panel may be located adjacently to the entrance to the aircraft interior unit. In this case, the door may be detachably mounted to the hollow panel. In this case, the door may be mounted on a rail within the hollow panel.

Alternatively, the door may be detachably mounted to another part of the wall, but in use be within hollow panel. In this case, the door may be mounted on a rail within the wall, but not within the hollow panel.

In embodiments, the door, when in the open position, may be disposed entirely within wall. In this case, the door, when in the open position, may be disposed entirely within hollow panel. Alternatively, the door may be disposed partly within hollow panel and partly within other parts of the wall.

In embodiments, the hollow panel may comprise one or more pins on an edge that, when the hollow panel is attached to the rest of the aircraft interior unit, extend into corresponding holes in the rest of the aircraft interior unit. The pins allow the hollow panel to be securely kept in position when positioned in the aircraft interior unit, while still being easily detachable by moving the hollow panel away from the aircraft interior unit to remove the pins from the corresponding holes.

In embodiments, the hollow panel may be secured to the rest of the aircraft interior unit by a latch. This allows the hollow panel to be easily secured to and detached from the aircraft interior unit. In this case, where the hollow panel is detachably mounted to a portion of the wall, the hollow panel may be secured to the portion of the wall by the latch.

In embodiments, the door may be secured to the wall by a latch. Similarly, this allows the hollow panel to be easily secured to and detached from the aircraft interior unit, in particular the wall thereof to which it is attached. In this case, where the door is detachably mounted to the hollow panel, the door may be secured to the hollow panel by the latch.

In embodiments, the aircraft interior unit may be an aircraft seating unit.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
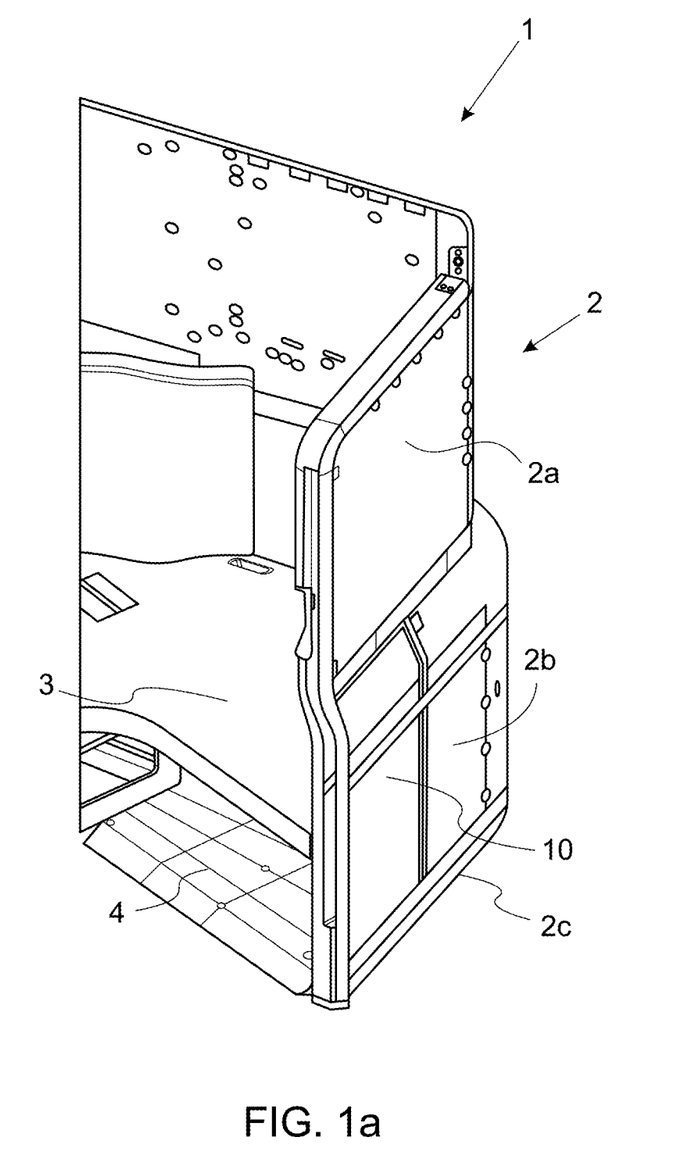
FIG. 1a shows a perspective view of an aircraft interior unit in accordance with an embodiment of the invention.
Figure 1B:
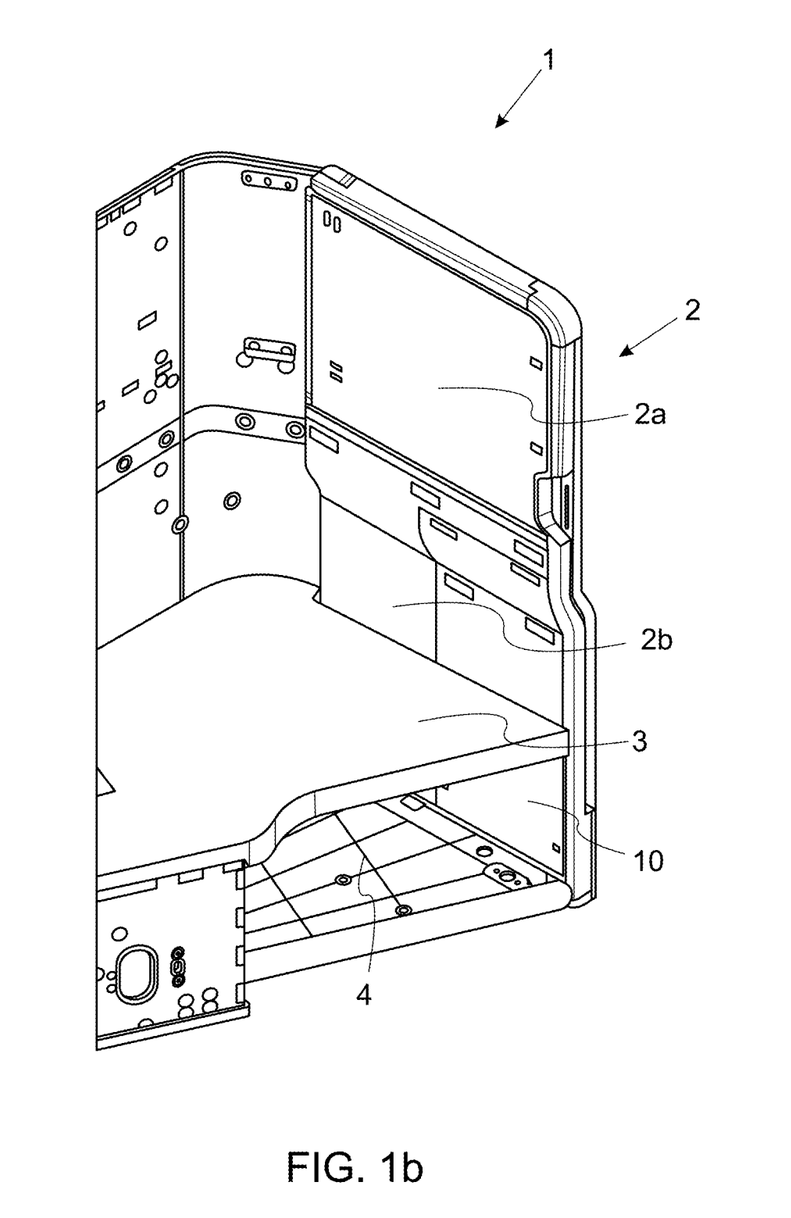
FIG. 1b shows another perspective view of the aircraft interior unit of FIG. 1.
Figure 1C:
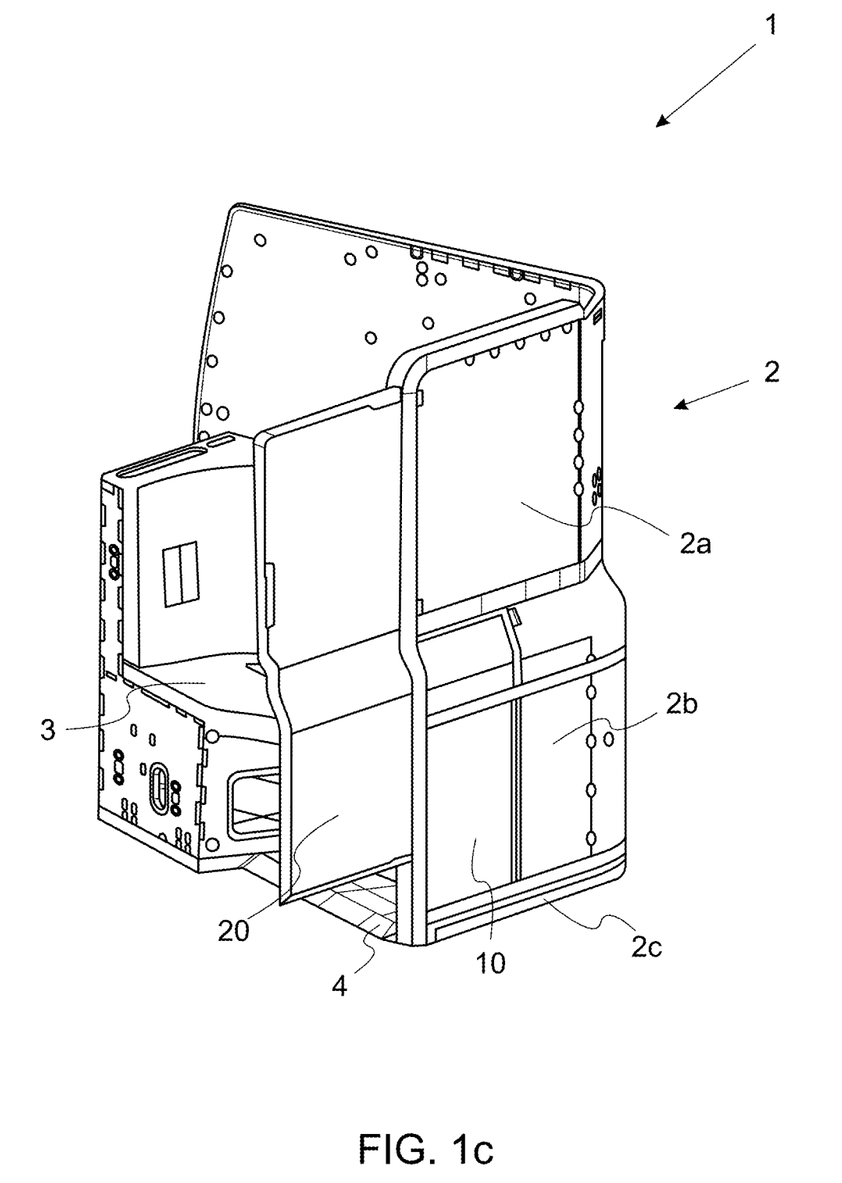
FIG. 1c shows a perspective view of the aircraft interior unit of FIG. 1 with a door in the closed position.

An aircraft interior unit in accordance with an embodiment of the invention is now described, with reference to FIGS. 1a to 1c. These figures show only part of the aircraft interior unit 1, sliced through to show the interior and exterior of one side of the aircraft interior unit 1. The aircraft interior unit 1 is an aircraft seating unit, with the part shown being the side of the aircraft interior unit 1 comprising an ottoman, the rest of the aircraft interior unit 1 comprising the passenger seat not being shown.

The aircraft interior unit 1 comprises a floor 4 and a wall 2. The wall 2 comprises a top portion 2a, a side portion 2b and a panel 10 underneath the top portion 2a, and a bottom portion 2c underneath the side portion 2b and a panel 10 at the level of the floor 4. An ottoman cushion 3 is arranged on a surface (not visible in the FIGS. 1a to 1c) so that it is in contact with the wall 2 along the end of the aircraft interior unit 1, in particular being in contact with the panel 10 and the side portion 2b.

The empty space adjacent to the panel 10, top portion 2a and bottom portion 2c forms an entrance to the aircraft interior unit 1. On the other side of the entrance there will be a further wall of the aircraft interior unit 1, a side of the aircraft cabin, a surface of another aircraft interior unit, or any other surface forming the other side of the entrance.

As discussed in more detail below, the panel 10, side portion 2b and top portion 2a are at least partly hollow. The aircraft interior unit 1 comprises a slidable door 20 mounted in the wall 2. In FIGS. 1a and 1b the door 20 cannot be seen, as the door 20 is in an open position, i.e. a position that leaves the entrance open, and so is entirely disposed within the hollow interiors of the panel 10, side portion 2b and top portion 2a. In FIG. 1c the door 20 is visible as it is in a closed position, i.e. a position in which it is no longer disposed within the hollow interiors of the panel 10, side portion 2b and top portion 2a, but rather it spans the width of the entrance so the entrance is closed, i.e. so that the door 20 blocks access to the aircraft interior unit 1 via the entrance.

Figure 2:
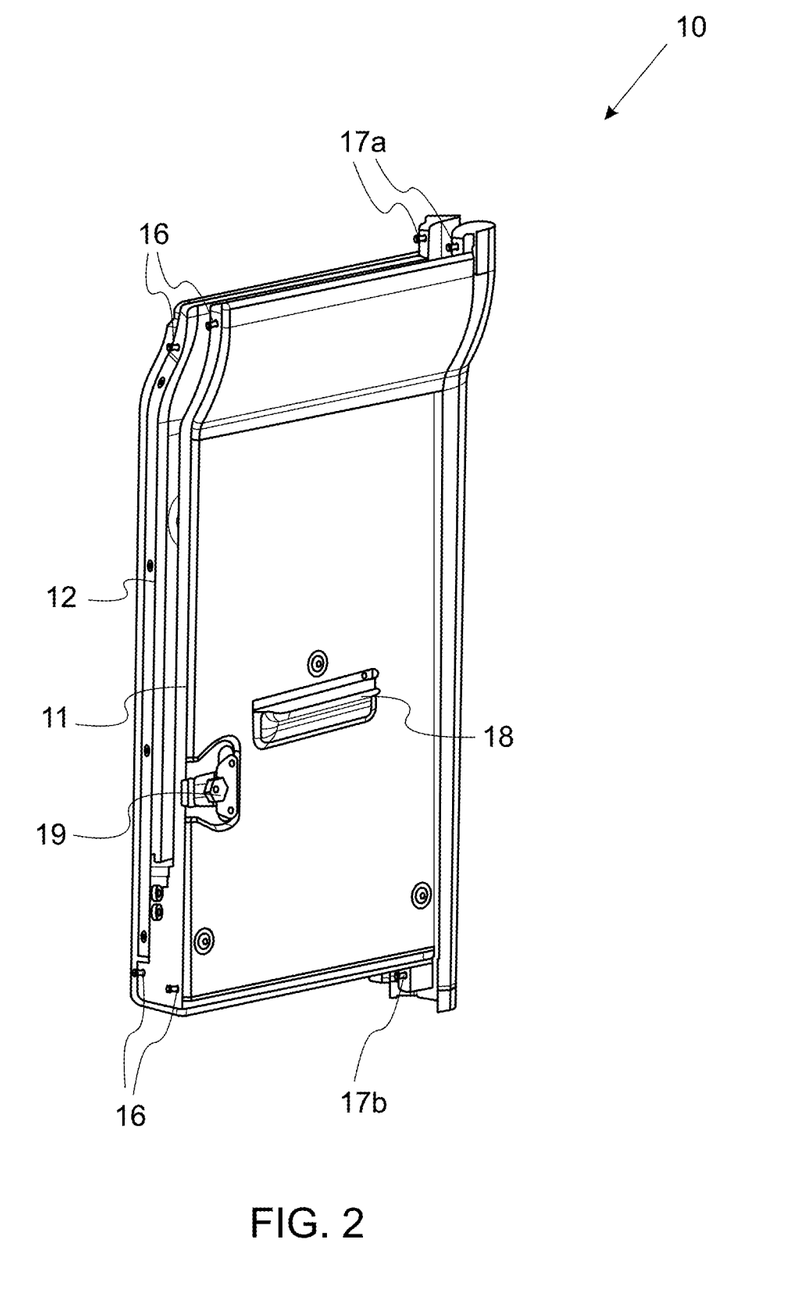
FIG. 2 shows a close-up view of a panel of the aircraft interior unit of FIGS. 1a to 1c.

FIG. 2 shows close-up view of the panel 10, in particular the inner side 11 of the panel 10 that faces the interior of the aircraft interior unit 1. A small part of the outer side 12 of the panel 11 that faces the exterior of the aircraft interior unit 1 can also be seen, with there being a gap between the inner side 11 and the outer side 12, so that the panel 10 is hollow. As discussed above, the door 20 can be disposed within the panel 10, in other words in the gap between inner side 11 and outer side 12 of the panel 10.

On the inner side 11 of the panel 10 is a shelf 18, which extends from the outer surface of the inner side 11, i.e. the surface that faces the interior of the aircraft interior unit 1. Further, on the outer surface of inner side 11 there is a latch 19. The latch 19 is on the edge of the inner side 11 that is adjacent to the side portion 2b of the wall 2, so that the panel 10 can be attached to and detached from the side portion 2b by means of the latch 19, as discussed in more detail below.

At the top and bottom of the edges of the inner side 11 and outer side 12 of the panel 10 that are adjacent to the side portion 2a, are four pins 16. The pins 16 extend from the panel 10 in the direction of the side portion 2a. In addition, at the top and bottom of the edges of the inner side 11 and outer side 12 of the panel 10 that are adjacent to the entrance to the aircraft interior unit 1 are extended portions, which extend a small distance beyond the rest of the top and bottom edges of the inner side 11 and outer side 12. On the extended portions on the top edges are a further two pins 17a, while on the extended portions on the bottom edges are a further two pins 17b, each of the pins 17a and 17b again extending in the direction of the side portion 2a. The edge of the side portion 2b adjacent to the panel 10 has four holes corresponding to the four pins 16, while the bottom of the edge of the top portion 2a adjacent to the entrance has two holes corresponding to the two pins 17a, and the top of the edge of the bottom portion 2c adjacent to the entrance has two holes corresponding to the two pins 17b. In this way, when the panel 10 is in position in the wall 2, the pins 16, 17a and 17b extend into the corresponding holes in the side portion 2b, top portion 2a and bottom portion 2c respectively, thus helping keep the panel securely in position.

Figure 3:
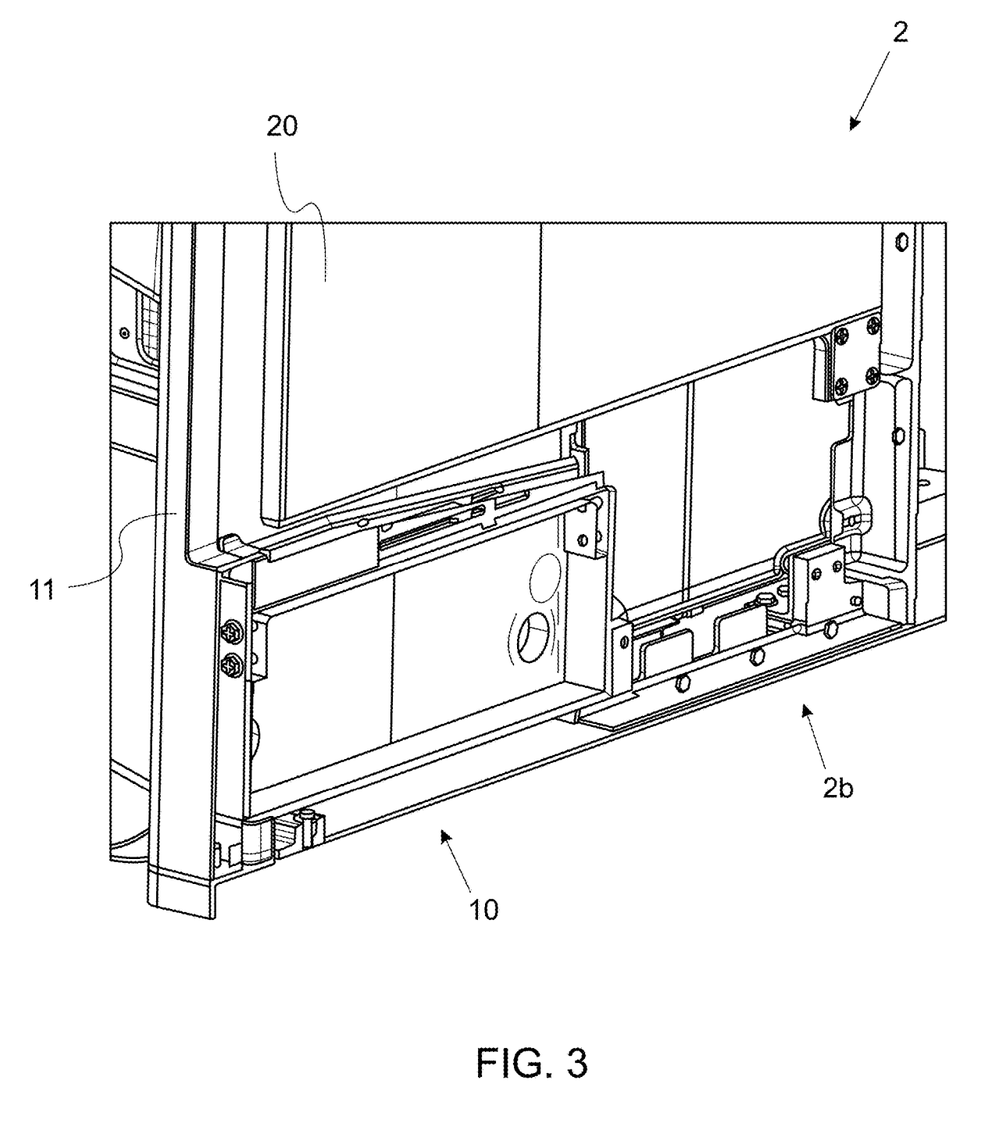
FIG. 3 shows a close-up view of the aircraft interior unit of FIGS. 1a to 1c, showing the panel and the door.

FIG. 3 shows a close-up view of a part of the wall 2 of the aircraft interior unit 1, in which the outer sides of the panel 10 and side portion 2b are not shown. The door 20 can be seen in open position, so disposed entirely within the panel 10 and side portion 2b. The door 20 is mounted in the wall 20 by a sliding mechanism, allowing it to be slid between the open position and closed position.

Figure 4A:
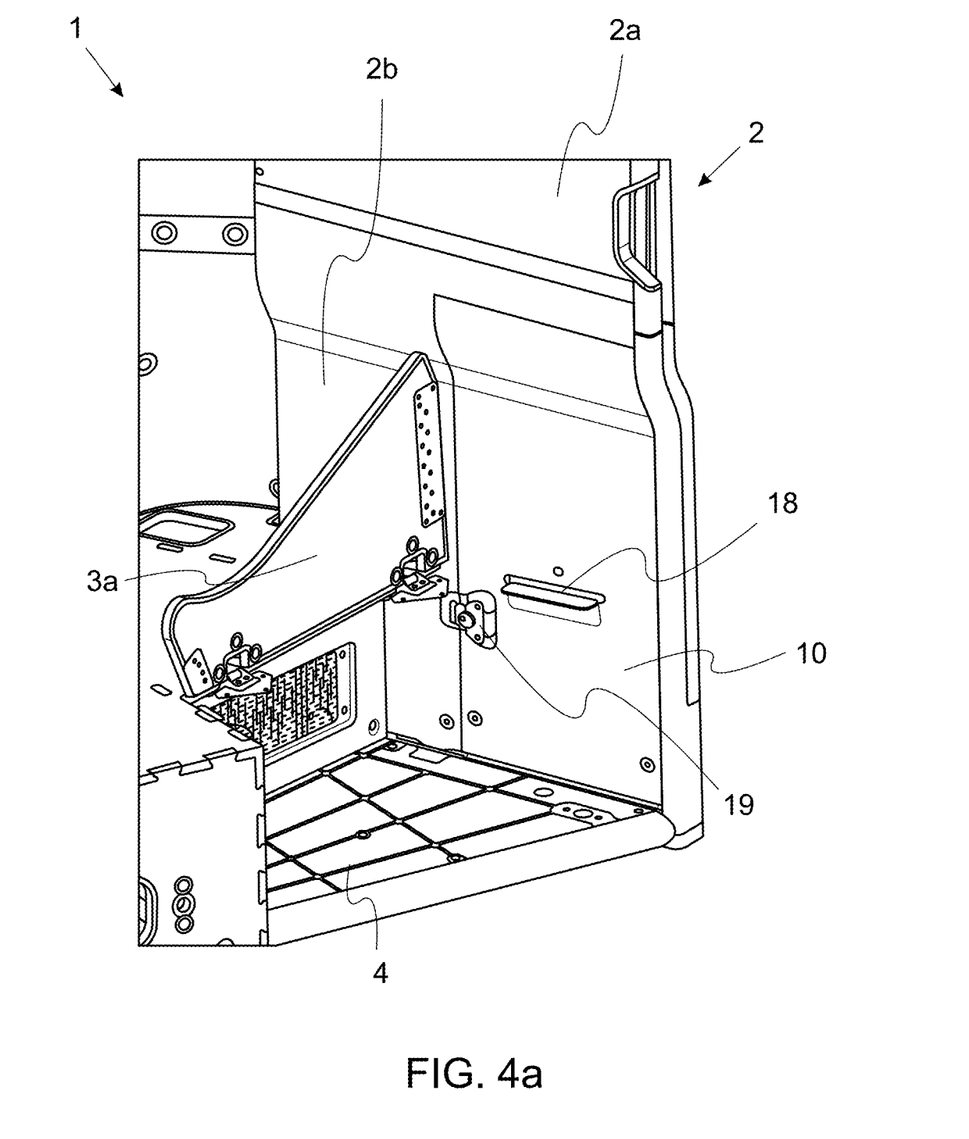
FIG. 4a shows a perspective view of the aircraft interior unit of FIGS. 1a to 1c, with a hinged shelf raised.
Figure 4B:
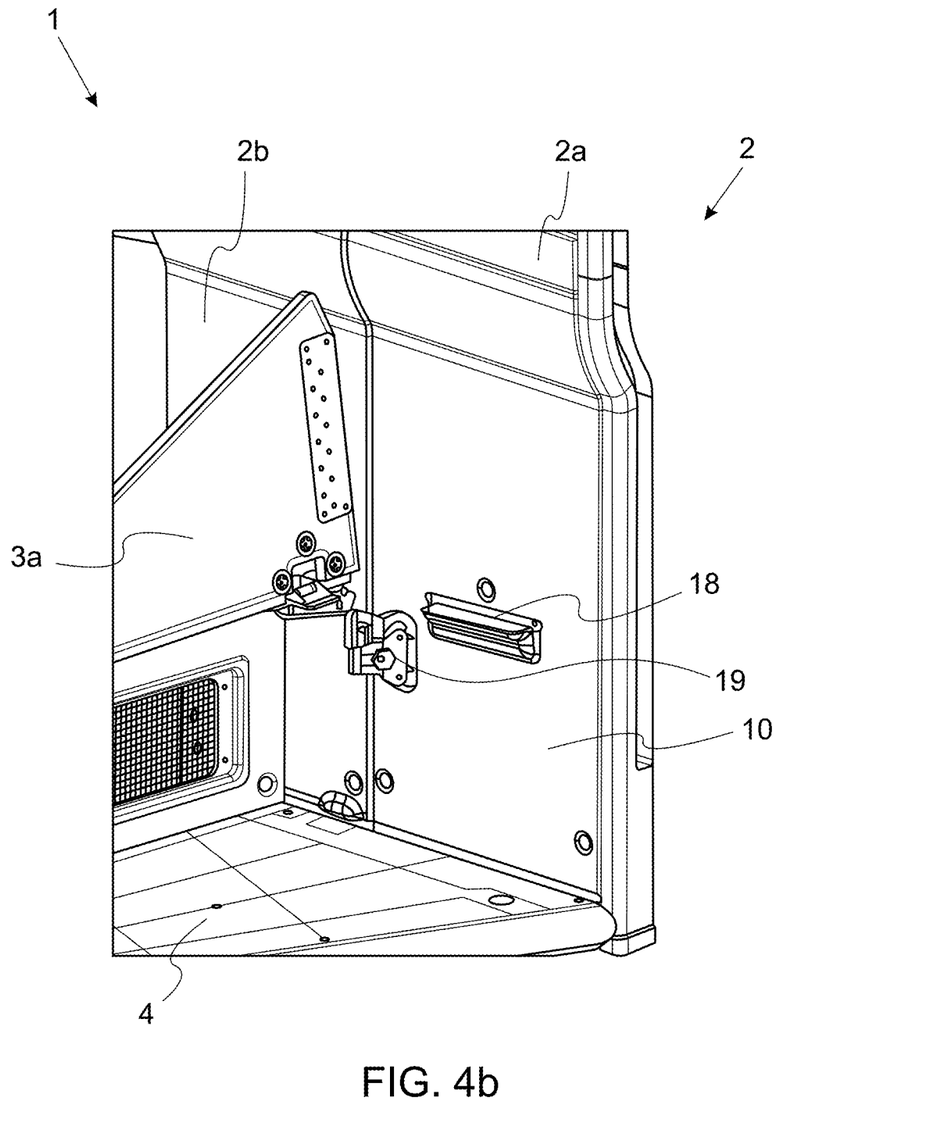
FIG. 4b shows a close up view of the aircraft interior unit of FIGS. 1a to 1c, with a panel latch released.
Figure 4C:
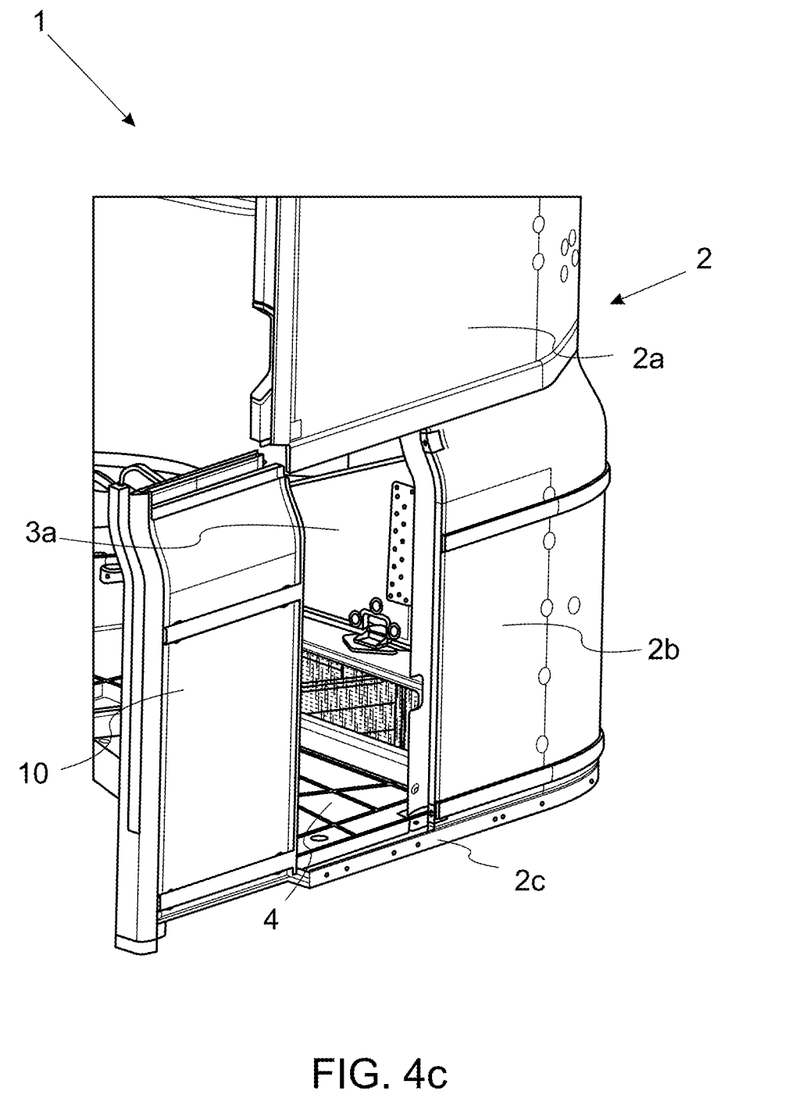
FIG. 4c shows a perspective view of the aircraft interior unit of FIGS. 1a to 1c, with the panel detached.
Figure 4D:
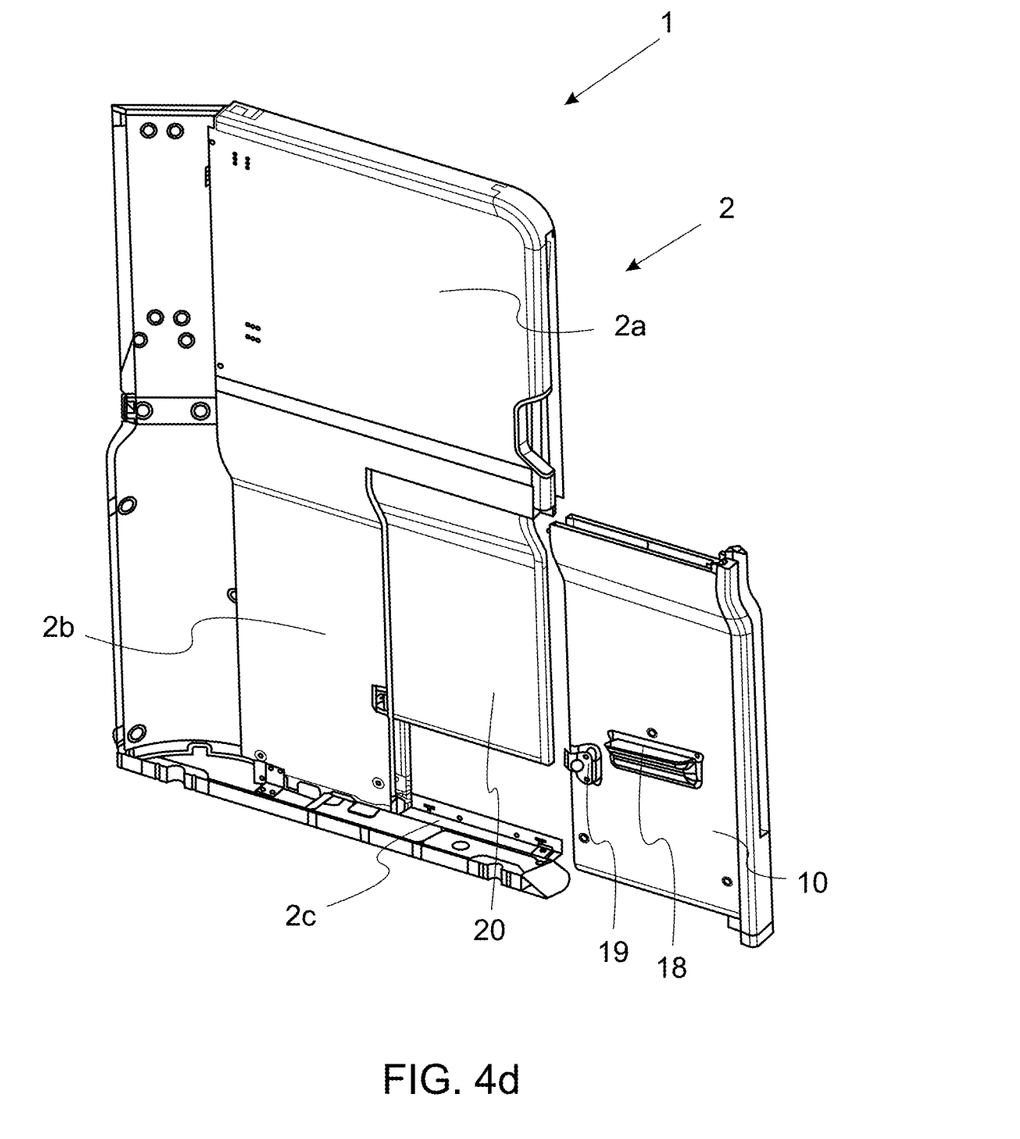
FIG. 4d shows another perspective view of the aircraft interior unit of FIGS. 1a to 1c, with the panel detached.
Figure 5:
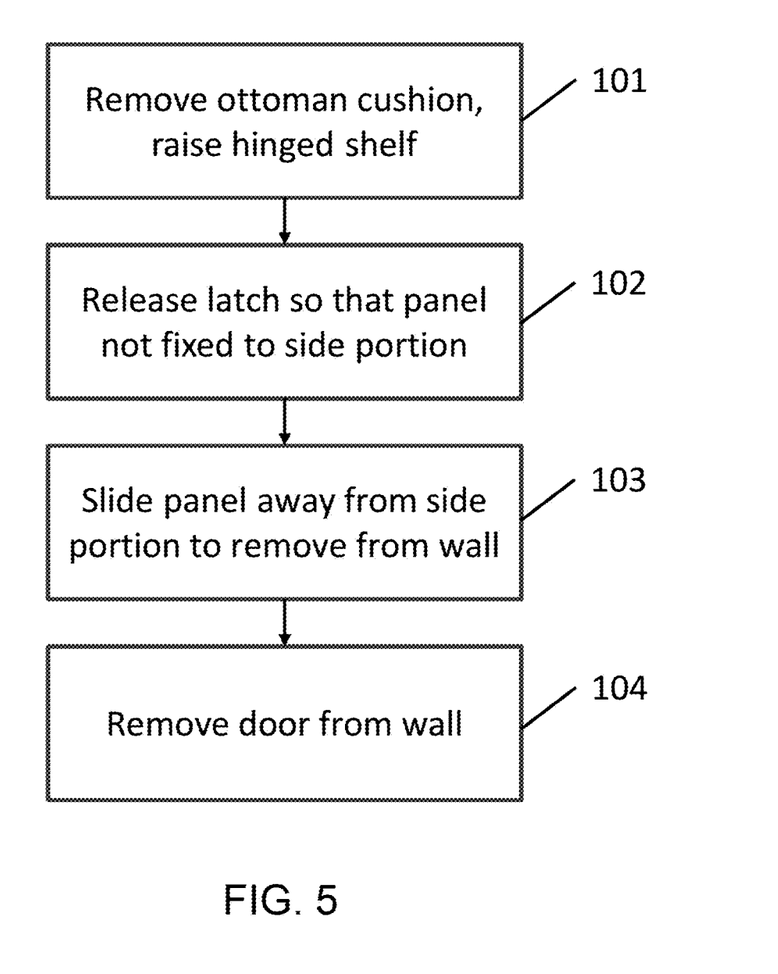
FIG. 5 is a flowchart showing a method of detaching the panel from the aircraft interior unit in accordance with an embodiment of the invention.

A method of detaching the panel 10 from the aircraft interior unit 1 in accordance with an embodiment of the invention is now described, with reference to FIGS. 4a to 4d and the flowchart of FIG. 5.

FIG. 4a shows the aircraft interior unit 1, in which the ottoman cushion 3 has been removed. As can be seen, the surface on which the ottoman cushion 3 is positioned comprises a hinged shelf 3a in the area adjacent to the panel 10. The hinged shelf 3a is hinged on an edge roughly perpendicular to the wall 2, so that it can be placed in a flat position in which the hinged shelf 3a rests on the shelf 18 of the panel 10, to provide a secure flat surface on which the ottoman cushion 3 is supported. However, as shown in FIG. 4a, in the first step of the method the ottoman cushion 3 is removed, and the hinged shelf 3a is raised to be in a vertical position in which it is positioned away from the panel 10 (step 101).

It can be seen in FIG. 4a that the panel 10 is fixed to the side portion 2b by the latch 19. In the next step of the method, the latch 19 is released so that the panel 10 is no longer fixed to the side portion 2b (step 102), as shown in FIG. 4b.

The panel 10 is slid away from the side portion 2a, so that the pins 16, 17a and 17b are removed from the corresponding holes in the side portion 2b, top portion 2a and bottom portion 2c respectively, allowing the panel 10 to be detached entirely from the wall 2 (step 103), as shown in FIG. 4c, which shows the exterior of the aircraft interior unit 1 with the door 20 omitted for clarity, and FIG. 4d, which shows the interior of the aircraft interior unit 1 with the door 20 visible in the closed position within the wall 2.

In the final step of the method, the door 20 is detached from the wall 2 (step 104). This is done simply by moving the door 20 out of the open position towards the closed position as shown in FIG. 1c (though with the panel 10 not present, of course), and then lifting it upwards to remove it from the sliding mechanism in the wall 2.

In present embodiment, the door 20 can be detached from the wall 2 only after the panel 10 has been detached, as the curves in the door 20 and panel 10 prevent the door 20 from being lifted upwards and away from the wall 2 while the door 20 is still partly within the panel 10. However in other embodiments, particularly embodiments in which the door is flat, the door can be removed from the wall while the panel is still in attached to the wall. This would most conveniently be done as a first rather than final step in the detaching of the panel, but it could in practice be done at any stage.

It will be appreciated that the panel 10 can be re-attached and the aircraft interior unit 1 reassembled simply be reversing these steps. In particular, the panel 10 is slid back into position adjacent to the side portion 2b, and fixed to the side portion 2b using the latch 19. The hinged shelf 3a is then lowered to be in contact with the shelf 18 of the panel 10, and the ottoman cushion 3 position on the surface of which the hinged shelf 3a is part. The door 20 is then put back into position on the sliding mechanism in the wall 2. The aircraft interior unit 1 is then fully reassembled.

It will also be appreciated that none of the steps of detaching or re-attaching the panel 10 require any tools, and can be done entirely by hand.

Figure 6A:
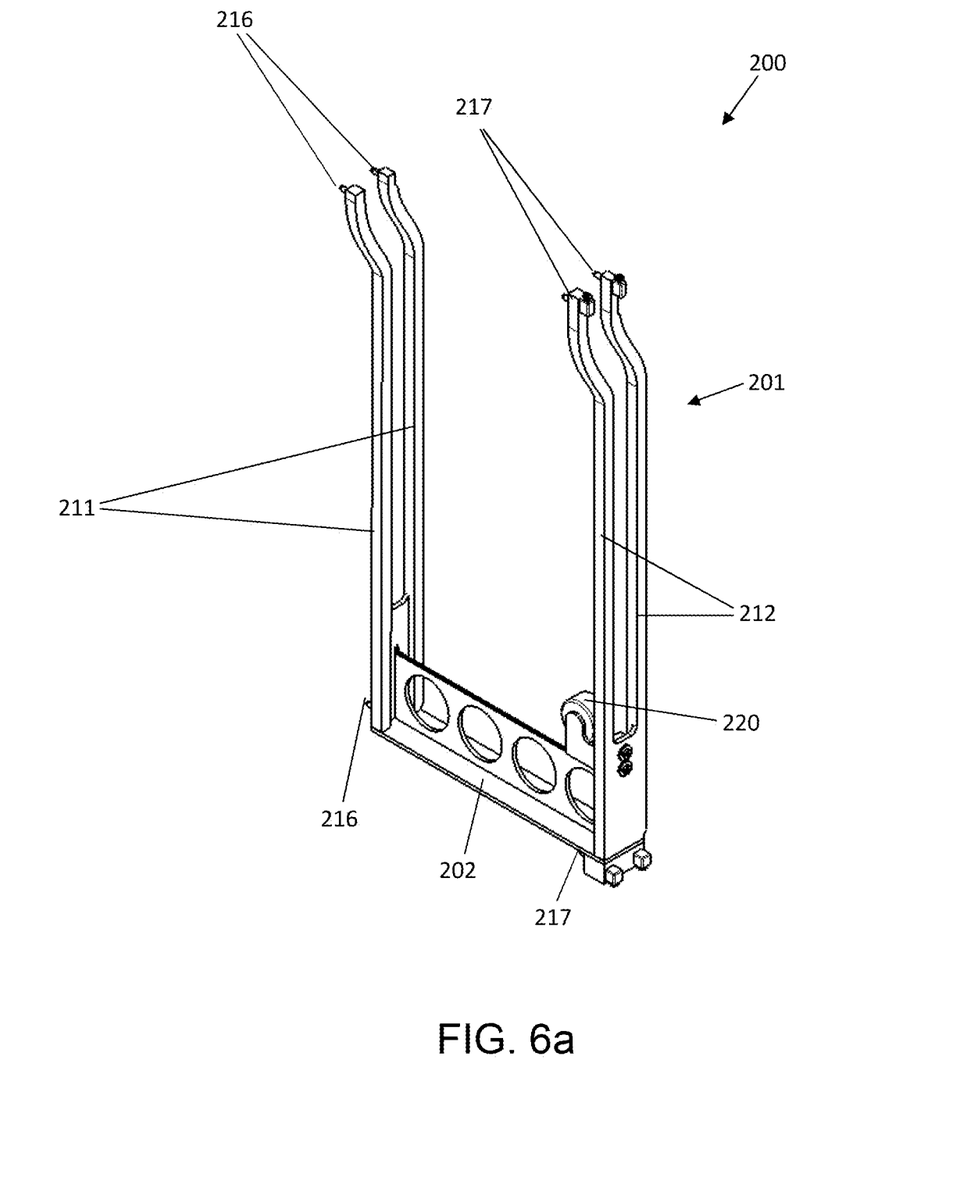
FIGS. 6a to 6c shows perspective views of a panel of an aircraft interior unit of another embodiment of the invention in various states of construction.
Figure 6B:
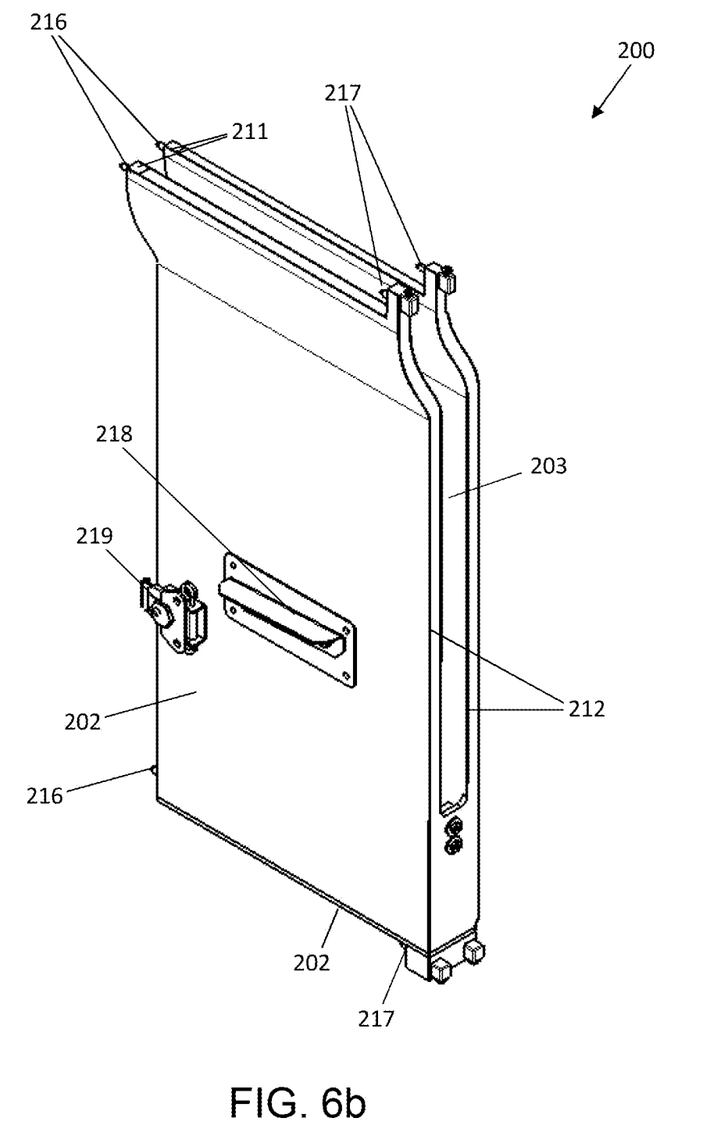
Figure 6C:
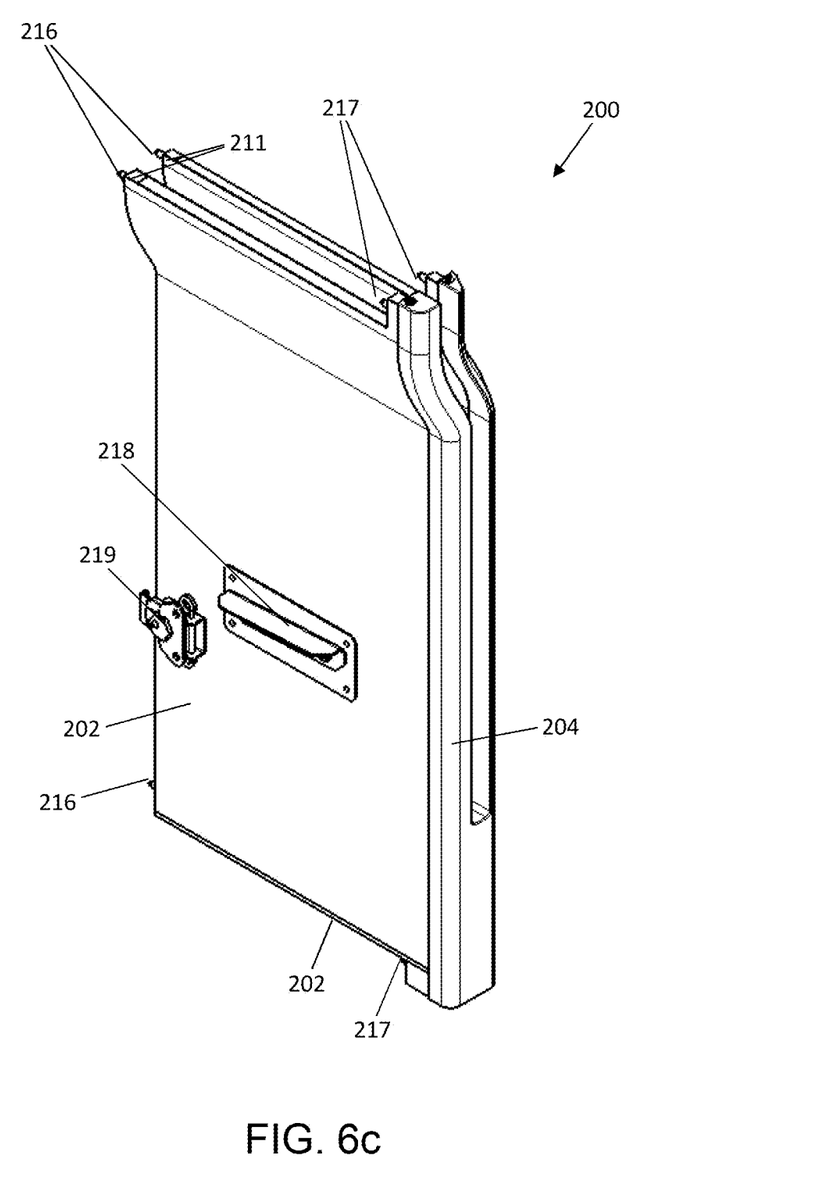

FIGS. 6a to 6c show perspective views of a panel of an aircraft interior unit of another embodiment of the invention in various states of construction. The panel 200 is similar to the panel 10 described above, and is used in an aircraft interior unit in an identical manner.

FIG. 6a shows an internal frame 201 of the panel 200, which is formed of cold-bonded aluminium blocks. As can be seen, the internal frame 201 has a base 202, with bars 211 extending upward from either side of the front end of the base 202, and bars 212 extending upward from either side of the back end of the base 202. On the tops and bottoms of the bars 211 are located pins 216, and at the tops and bottoms of the bars 212 are located pins 217. (Not all of the pins 216 and 217 are visible.) As with the panel 10, in use these help secure the panel 200 in place in the aircraft interior unit in which it is used.

As can be seen, the bars 211 and 212 form a U-shape at either end of the bases 202, through which a slidable door can move. The base 202 comprises a roller 220 to provide support to the door.

FIG. 6b shows the internal frame 201 of the panel 200 with an internal panel 202 and an external panel 203 fixed to either side of the internal frame 201. The internal panel 202 and an external panel 203 are formed of a composite material. As can be see, the internal panel 202 and an external panel 203 are fixed to, and so supported by, the bars 211 and 212 of the internal frame 201. The outer surface of the internal panel 202 (i.e. the surface that will face towards the interior of the aircraft interior unit) has on it a shelf 218 and latch 219.

Finally, FIG. 6c shows the panel 200 with an aesthetic end capping 204 attached to the outside edge of the bars 212. The end capping 204 covers the end of the panel 200 that will be adjacent to the entrance to the aircraft interior unit, so generally visible when the panel 200 is in position in the aircraft interior unit.

While the present invention has been described and illustrated with reference to particular embodiments, it will be appreciated by those of ordinary skill in the art that the invention lends itself to many different variations not specifically illustrated herein. By way of example only, certain possible variations will now be described.

While in the present embodiment the aircraft interior unit 1 is an aircraft seat unit, it will be appreciated that in other embodiments the aircraft interior unit could be any other unit found in an aircraft interior requiring a door and a detachable panel.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft interior unit comprising:
   a wall,
   a hollow panel detachably mounted to the wall, and
   a door detachably mounted to the wall, the door being slidable between a closed position in which it covers an entrance to the aircraft interior unit, and an open position in which the entrance to the aircraft interior unit is uncovered;
   wherein the door, when in the open position, is at least partially disposed within the hollow panel;
   wherein the hollow panel can be detached from the wall while the door is still attached to the wall; and
   wherein the door, when moved from the open position, can be detached from the wall while the hollow panel is still attached to the wall.

2. The aircraft interior unit as claimed in claim 1, wherein a portion of the wall extends above the hollow panel.

3. The aircraft interior unit as claimed in claim 1, wherein the portion of the wall to which the hollow panel is detachably mounted is on the opposite side of the hollow panel to the door when in the open position.

4. The aircraft interior unit as claimed in claim 1, wherein the hollow panel is located adjacently to the entrance to the aircraft interior unit.

5. The aircraft interior unit as claimed in claim 1, wherein the door is mounted on a rail within the panel.

6. The aircraft interior unit as claimed in claim 1, wherein the door, when in the open position, is disposed entirely within the wall.

7. The aircraft interior unit as claimed in claim 6, wherein the door, when in the open position, is disposed entirely within the hollow panel.

8. The aircraft interior unit as claimed in claim 1, wherein the hollow panel comprises one or more pins on an edge that, when the hollow panel is attached to the rest of the aircraft interior unit, extend into corresponding holes in the rest of the aircraft interior unit.

9. The aircraft interior unit as claimed in claim 1, wherein the hollow panel is secured to the rest of the aircraft interior unit by a latch.

10. The aircraft interior unit as claimed in claim 1, wherein the door is secured to the wall by a latch.

11. The aircraft interior unit as claimed in claim 1, wherein the aircraft interior unit is an aircraft seating unit.

* * * * *